UNITED STATES PATENT OFFICE.

HUGH C. SICARD, OF BUFFALO, NEW YORK, ASSIGNOR TO UNITED STATES FERRO ALLOYS CORPORATION, OF NEW YORK, N. Y., A CORPORATION OF NEW YORK.

METHOD OF PRESERVING ELECTRIC-FURNACE LININGS.

1,416,584.  Specification of Letters Patent.  Patented May 16, 1922.

No Drawing.  Application filed February 12, 1920. Serial No. 358,211.

*To all whom it may concern:*

Be it known that I, HUGH C. SICARD, a citizen of the United States of America, and a resident of the city of Buffalo, county of Erie, and State of New York, have invented a certain new and useful Method of Preserving Electric-Furnace Linings, of which the following is a full, clear, and exact description.

This invention relates to a method of preserving electric furnace linings during the production of alloys of titanium and iron in which there are various contents of titanium.

Heretofore alloys of titanium and iron of various grades have been made in electric furnaces of the Siemen's type such furnace being provided with a bottom conductor. In such furnaces, it has been found that the only lining able to stand the fluxing action of titanic oxide has been one made of carbon bricks.

In my invention I use a method by which a furnace lining of titanic oxide or an ore bearing titanic oxide is conserved, and by which, an electrically conducting furnace bottom consisting essentially of the titanium alloy being manufactured is formed and conserved and at the same time eliminate completely the carbon lining which makes it impossible to regulate the carbon content of the alloy.

In carrying out my invention I make use of a single-phase, two-electrode furnace or preferably a polyphase, multiple, electrode furnace.

Preferably, my furnace is composed of a casing made of a heavy steel plate and a bottom formed of a heavy iron casting large enough to act as a chill. This bottom, if necessary or desirable, can be cooled by artificial means such as by air currents or a water cooling system, or other similar means, then I ram on the bottom a mixture of an ore bearing titanic oxide with enough carbonaceous material so that when it is all submitted to an intense heat, the ore will be reduced to a metallic sponge. Then I build the walls of my furnace with titanium bricks (formed of titaniferous ore high in titanic oxide) and I finish shaping the inside of the crucible with a mixture of titaniferous ore, ilmenite, or rutile.

The electrodes are then lowered till they touch the rammed bottom of the furnace and I then fill the furnace completely with the charge which consists of a mixture of titaniferous ore and some form of metallic iron such as scrap iron or an iron oxide, such as mill scale together with the necessary amount of carbonaceous material such as coke, anthracite, charcoal and the like in the proportions necessary to reduce the titanium and iron oxides. These two oxides are so proportioned that when reduced they will form a ferro-titanium containing the desired percentage of titanium. The ore used will probably contain as impurities materials such as alumina, silica, magnesia, etc., which will not be reduced but will form a fusible slag and anyone skilled in metallurgy can determine from the composition of the ore what slagging additions are necessary to form a suitable slag.

The following is a typical analysis of the titaniferous ore mined in Canada:

$TiO^2 = 34.36\%$    $SiO^2 = 4.14\%$
$FeO = 50.53\%$    $Al^2O^3 = 2.20\%$

When the electric current is switched on, the rammed material in the furnace bottom is reduced to a porous metallic sponge and as the supernatant charge is reduced this sponge will become filled with metallic infiltrations from the charge which on reaching the cool iron bottom of the casing will be chilled and solidify. Thus the furnace bottom will consist of a more or less porous solid metallic mass in immediate contact with the iron plate forming the bottom of the casing, above this a stiff viscous mass of metal, while on this will be the fluid bath of iron and titanium covered with slag, when the smelting operation is complete. The furnace is then tapped drawing off both the fluid bath and the slag while the metallic bottom which I have formed remains.

In general when the furnace has been tapped the lining which I put in has been attacked in places; but in my method it is not necessary to make any repairs thereto for I again fill the furnace completely with a new charge after having lowered the electrodes to the bottom. I find that the added charge fills up the attacked parts of the lining thus forming itself a suitable lining material.

It will be noted that by varying the amount of carbon in the mixture, by means of my invention I can vary the amount of carbon in the metallic bath. This result would be impossible if the reduction were carried on in an electric furnace of the Siemen's type provided with a carbon bottom and lining.

Having thus described my invention, what I claim is:

1. A method of preserving electric furnace linings comprising the formation of a titanic oxide furnace lining and then smelting in the furnace a mixture composed of a titaniferous ore and metallic ore.

2. A method of preserving electric furnace linings comprising the formation of a titanic oxide furnace lining and then smelting in the furnace a mixture composed of a titaniferous ore and metallic iron.

3. A method of preserving electric furnace linings comprising the formation of a lining made from a mixture containing an ore bearing titanic oxide and some carbonaceous material and then smelting in the furnace a mixture composed of a titaniferous ore and metallic iron.

4. A method of preserving electric furnace linings comprising the formation of a furnace lining made from a mixture of ilmenite and some carbonaceous material and then smelting in the furnace a mixture composed of a titaniferous ore and a titanic oxide.

5. A method of preserving electric furnace linings comprising the formation of a lining made from a mixture of rutile and some carbonaceous material and then smelting in the furnace a mixture composed of a titaniferous ore and a metallic oxide.

6. A method of preserving electric furnace linings comprising the formation of a furnace lining made from a mixture of an ore bearing titanic oxide and some carbonaceous material and then smelting in the furnace a mixture composed of a titaniferous ore, metallic iron and a sufficient quantity of carbonaceous material to reduce all the oxide to a metallic form.

7. A method of preserving electric furnace linings comprising the formation of a furnace lining made from an ore bearing titanic oxide, then smelting in the furnace a mixture composed of a titaniferous ore, metallic iron and a sufficient quantity of carbonaceous material to reduce all the oxides to a metallic form, and then tapping and drawing off the fluid bath and slag.

8. A method of preserving electric furnace linings comprising the formation of a furnace lining made from an ore bearing titanic oxide and then smelting in the furnace a mixture composed of a titaniferous ore and metallic iron, then tapping and drawing off the fluid bath and slag, and then adding a new charge of like composition as the first charge, whereby the new charge will fill up the attacked parts of the lining and thus form itself a suitable lining material.

In testimony whereof, I have hereunto signed my name.

HUGH C. SICARD.